United States Patent
Ellis et al.

(10) Patent No.: US 10,579,053 B2
(45) Date of Patent: Mar. 3, 2020

(54) AIRCRAFT CONTROL BASED ON FUEL, TIME, AND DETERIORATION COSTS

(71) Applicant: GE Aviation Systems LLC, Grand Rapids, MI (US)

(72) Inventors: Albert Jeffrey Ellis, Grand Rapids, MI (US); Mark Lawrence Darnell, Grand Rapids, MI (US); David Michael Lax, Grand Rapids, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 186 days.

(21) Appl. No.: 15/651,276

(22) Filed: Jul. 17, 2017

(65) Prior Publication Data

US 2018/0067480 A1 Mar. 8, 2018

Related U.S. Application Data

(60) Provisional application No. 62/384,883, filed on Sep. 8, 2016.

(51) Int. Cl.
| | |
|---|---|
| G05D 1/00 | (2006.01) |
| G05D 1/04 | (2006.01) |
| G01C 21/00 | (2006.01) |
| G08G 5/00 | (2006.01) |

(52) U.S. Cl.
CPC ........... *G05D 1/0005* (2013.01); *G01C 21/00* (2013.01); *G05D 1/042* (2013.01); *G08G 5/0034* (2013.01)

(58) Field of Classification Search
None
See application file for complete search history.

(56) References Cited

U.S. PATENT DOCUMENTS

| | | | | |
|---|---|---|---|---|
| 4,325,123 | A * | 4/1982 | Graham | G05D 1/0005 244/182 |
| 4,827,417 | A | 5/1989 | Berger et al. | |
| 8,290,683 | B2 * | 10/2012 | Luppold | F02C 9/42 340/945 |
| 8,600,675 | B1 | 12/2013 | Borghese et al. | |
| 9,542,851 | B1 * | 1/2017 | Kim | G08G 5/0047 |

(Continued)

OTHER PUBLICATIONS

Extended European Search Report and Opinion issued in connection with corresponding EP Application No. 17189638.4 dated Jan. 16, 2018.

(Continued)

*Primary Examiner* — Thomas G Black
*Assistant Examiner* — Demetra R Smith-Stewart
(74) *Attorney, Agent, or Firm* — Dority & Manning, P.A.

(57) ABSTRACT

Systems and methods for determine a cost-improved set of control commands for an aircraft based at least in part on deterioration costs are provided. One example computing device is configured to iteratively: input a candidate set of control commands for the aircraft into the deterioration cost model; receive, as an output of the deterioration cost model, an estimated deterioration cost associated with the candidate set of control commands; input the estimated deterioration cost into a cost function to obtain a total estimated cost associated with the candidate set of control commands; and determine an improved set of control commands based at least in part on the total estimated cost and the cost function.

20 Claims, 5 Drawing Sheets

(56) References Cited

U.S. PATENT DOCUMENTS

| | | |
|---|---|---|
| 2003/0176954 A1 | 9/2003 | Jaw |
| 2010/0262442 A1 | 10/2010 | Wingenter |
| 2014/0018980 A1 | 1/2014 | Bollapragada et al. |
| 2014/0336867 A1 | 11/2014 | Covington et al. |
| 2015/0185111 A1 | 7/2015 | Armstrong et al. |
| 2015/0279218 A1* | 10/2015 | Irrgang ............... G08G 5/0039 |
| | | 701/3 |
| 2015/0284103 A1* | 10/2015 | Swann .................. B64D 31/10 |
| | | 701/3 |
| 2015/0323933 A1 | 11/2015 | Darbois et al. |
| 2015/0371544 A1 | 12/2015 | Mere |
| 2016/0236790 A1* | 8/2016 | Knapp ................. B64C 11/001 |

OTHER PUBLICATIONS

Office Action issued in connection with corresponding CA Application No. 2977162 dated Jun. 7, 2018.

\* cited by examiner

AIRCRAFT CONTROL BASED ON FUEL, TIME, AND DETERIORATION COSTS

PRIORITY CLAIM

The present application claims the benefit of priority of U.S. Provisional Patent Application No. 62/384,883, entitled "IMPROVED AIRCRAFT CONTROL BASED ON FUEL, TIME AND DETERIORATION COSTS," filed Sep. 8, 2016, which is incorporated herein by reference for all purposes.

FIELD

The present application relates generally to improved aircraft performance. More particularly, the present application relates to systems and methods that determine a cost-improved set of control commands for an aircraft based at least in part on deterioration costs, such as, for example, maintenance costs and/or loss in system value due to use.

BACKGROUND

Avionics systems located on an aircraft can be used to determine optimal or enhanced operating states for the aircraft based on various operating conditions and other parameters. For instance, data indicative of engine operating modes, flight path information, engine power settings (e.g., thrust setting, fuel flow, etc.), altitude, trim conditions, weight, and other operating parameters can be used to determine control commands, such as speed and/or altitude of an aircraft, to reduce the cost of conducting a flight. The aircraft can be controlled in accordance with the determined control commands to increase efficiency.

Thus, conventional approaches for reducing aircraft operating costs can include selecting control commands that reduce direct operating cost based on a model of the aircraft performance. For example, a Flight Management System (FMS) typically employs a cost function that considers the cost of fuel and the time-related cost to operate the airplane to determine the most efficient control commands that are input to the flight control system for a specified mission.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a computing device to determine improved flight control commands for an aircraft. The computing device includes at least one processor and at least one computer-readable medium that stores a deterioration cost model that models aircraft system deterioration cost as a function of input control commands. In some implementations, the aircraft system deterioration cost can be modeled as a function of operating state of the aircraft and/or one or more engines of the aircraft. The at least one computer-readable medium further stores instructions that, when executed by the at least one processor, cause the computing device to iteratively: input a candidate set of control commands for the aircraft into the deterioration cost model; receive, as an output of the deterioration cost model, an estimated deterioration cost associated with the candidate set of control commands; input the estimated deterioration cost into a cost function to obtain a total estimated cost associated with the candidate set of control commands; and determine an improved set of control commands based at least in part on the total estimated cost and the cost function.

In some implementations, the improved set of control commands yield a lower cost relative to all other candidate sets of control commands. The computing device can iteratively determine new candidate sets of control commands until the improved set of control commands that yield a minimum total estimated cost is identified.

In some implementations the deterioration cost model can be an engine consumption model that models engine consumption as a function of the input control commands. In some implementations, the engine consumption model can be a schedule of cost as a function of one or more operating parameters of the aircraft system. In some implementations, the aircraft system can include one or more engines of the aircraft, and the one or more operating parameters can include, without limitation, operating temperature of the engine(s), core speed of the engine(s), fan speed of the engine(s), or any other suitable operating parameter.

In some implementations, the computing device can be a Flight Management System (FMS) that is physically located within the aircraft. In some implementations, execution of the instructions further causes the FMS to control the aircraft according to the improved set of control commands.

In some implementations, the candidate set of control commands and the improved set of control commands include values for one or more of aircraft speed, aircraft flight path, aircraft altitude, and one or more engine power settings.

In some implementations, at least one of the deterioration cost model and the cost function penalizes the candidate set of control commands when the candidate set of control commands violates one or more control constraints.

In some implementations, to determine the improved set of control commands based at least in part on the total estimated cost and the cost function, the computing device selects a new candidate set of control commands based at least in part on the total estimated cost and the cost function. In some implementations, the computing device is constrained to select as the new candidate set of control commands only combinations of control commands that do not violate one or more control constraints. For example, in some implementations, the deterioration cost may not be assessed, but rather the range of control commands available for selection is limited. Thus, in some implementations, the candidate sets of control commands can be constrained or limited such that an operating state that increases deterioration cost is avoided. The sets of control commands that are constrained in this manner can be referred to as admissible control commands. Thus, the set of admissible control commands is the set of all control commands that comply with specified control constraints.

Another example aspect of the present disclosure is directed to a computer-implemented method to determine improved flight control commands for an aircraft. The method includes obtaining, by one or more computing devices, a first set of control commands for the aircraft. The method includes determining, by the one or more computing devices, a first deterioration cost associated with the first set of control commands based at least in part on a deterioration cost model for the aircraft. The method includes determining, by the one or more computing devices, a first total cost associated with the first set of control commands based at least in part on the first deterioration cost. The method includes determining, by the one or more computing devices, an updated set of control commands for the aircraft based at least in part on the first total cost.

In some implementations, the updated set of control commands yield a lower cost relative to all other sets of control commands. The computing device can iteratively determine new sets of control commands until the updated set of control commands that yield a minimum total estimated cost is identified.

In some implementations, determining, by the one or more computing devices, the first deterioration cost associated with the first set of control commands based at least in part on the deterioration cost model for the aircraft includes determining, by the one or more computing devices, a first engine deterioration cost associated with the first set of control commands based at least in part on an engine consumption model for the aircraft.

In some implementations, determining, by the one or more computing devices, the engine deterioration cost associated with the set of control commands based at least in part on the engine consumption model for the aircraft includes: accessing, by the one or more computing devices, an engine consumption schedule that provides cost as a function of one or more operating parameters of the aircraft; and determining, by the one or more computing devices, the engine deterioration cost based at least in part on the engine consumption schedule, where the engine deterioration cost is in units of dollars.

In some implementations, the one or more computing devices consist of a Flight Management System. In some implementations, the method further includes controlling, by the flight management system, the aircraft according to the updated set of control commands.

In some implementations, obtaining, by the one or more computing devices, the set of control commands includes obtaining, by the one or more computing devices, one or more values for aircraft speed, aircraft flight path, aircraft altitude, and engine power settings.

In some implementations, at least one of determining, by the one or more computing devices, the deterioration cost associated with the set of control commands and determining, by the one or more computing devices, the total cost associated with the set of control commands includes penalizing, by the one or more computing devices, the set of control commands when the set of control commands violates one or more control constraints.

In some implementations, determining, by the one or more computing devices, the updated set of control commands for the aircraft includes selecting, by the one or more computing devices, a new candidate set of control commands based at least in part on the total cost, wherein selecting, by the one or more computing devices, the new candidate set of control commands includes selecting, by the one or more computing devices, only combinations of control commands that do not violate one or more control constraints.

Another example aspect of the present disclosure is directed to one or more computer-readable media that store instructions that, when executed by one or more processors, cause the one or more processors to: obtain an initial candidate set of control commands for an aircraft and input the initial candidate set of control commands into a cost function. The cost function includes a component that models a deterioration cost associated with an aircraft system as a function of the input control commands. Execution of the instructions causes the one or more processors to: implement a solver to reduce the cost function; and select a final set of control commands for the aircraft, where the final set of control commands is associated with the reduced cost function.

In some implementations, the one or more computer-readable media are included in a Flight Management System physically located within the aircraft.

In some implementations, the component of the cost function is an engine consumption model that models engine consumption as a function of the input control commands.

In some implementations, to implement the solver to reduce the cost function, the one or more processors implement an iterative least-squares solver to minimize the cost function.

Another example aspect of the present disclosure is directed to computing device configured to: obtain an initial candidate set of control commands for an aircraft; input the initial candidate set of control commands into a cost function; implement a solver to reduce the cost function (that is, find a minimum cost of operating the aircraft); and select a final set of control commands for the aircraft. The final set of control commands is associated with the reduced cost function. The computing device is further configured to ensure that the final set of control commands does not violate one or more control constraints.

In some implementations, the cost function includes a component that models a deterioration cost associated with an aircraft system as a function of the input control commands.

In some implementations, to ensure that the final set of control commands does not violate one or more control constraints, the computing device is configured to: determine whether at least one of the initial candidate set of control commands and the final set of control commands violate one or more control constraints; and in response to a determination that at least one of the initial candidate set of control commands and the final set of control commands violate one or more control constraints, revise the at least one of the initial candidate set of control commands and the final set of control commands to resolve the violation of the one or more control constraints. In some implementations, to ensure that the final set of control commands does not violate one or more control constraints, the computing device is configured to limit a search space available to the solver to control commands that do not violate one or more control constraints.

In some implementations, the one or more control constraints prohibit combinations of control commands associated with increased deterioration costs.

Another example aspect of the present disclosure is directed to a computing device configured to: obtain an initial candidate set of control commands for an aircraft and input the initial candidate set of control commands into a cost function. The computing device is further configured to implement a solver to reduce the cost function and select a final set of control commands for the aircraft, where the final set of control commands is associated with the reduced cost function. The cost function is designed to reward sets of control commands that extend the engine service time until a maintenance action is required. Thus, over the life of an engine, fewer maintenance operations are required and maintenance cost is reduced.

In an alternative approach, the systems and methods of the present disclosure can maximize a service time function rather than minimize a cost function. The service time function can model service time of one or more aircraft systems (e.g., the aircraft engines) as a function of the input control commands. In one example implementation, new candidate control commands are iteratively selected until the service time function is maximized. Thus, in one example applied to aircraft engines, maximization of the service time function extends the engine service time until a maintenance action is required. Thus, over the life of an engine, fewer maintenance operations are required and deterioration cost is reduced.

Other example aspects of the present disclosure are directed to systems, computer-readable media, aircraft, devices, processes, and apparatus for enhancing aircraft performance.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
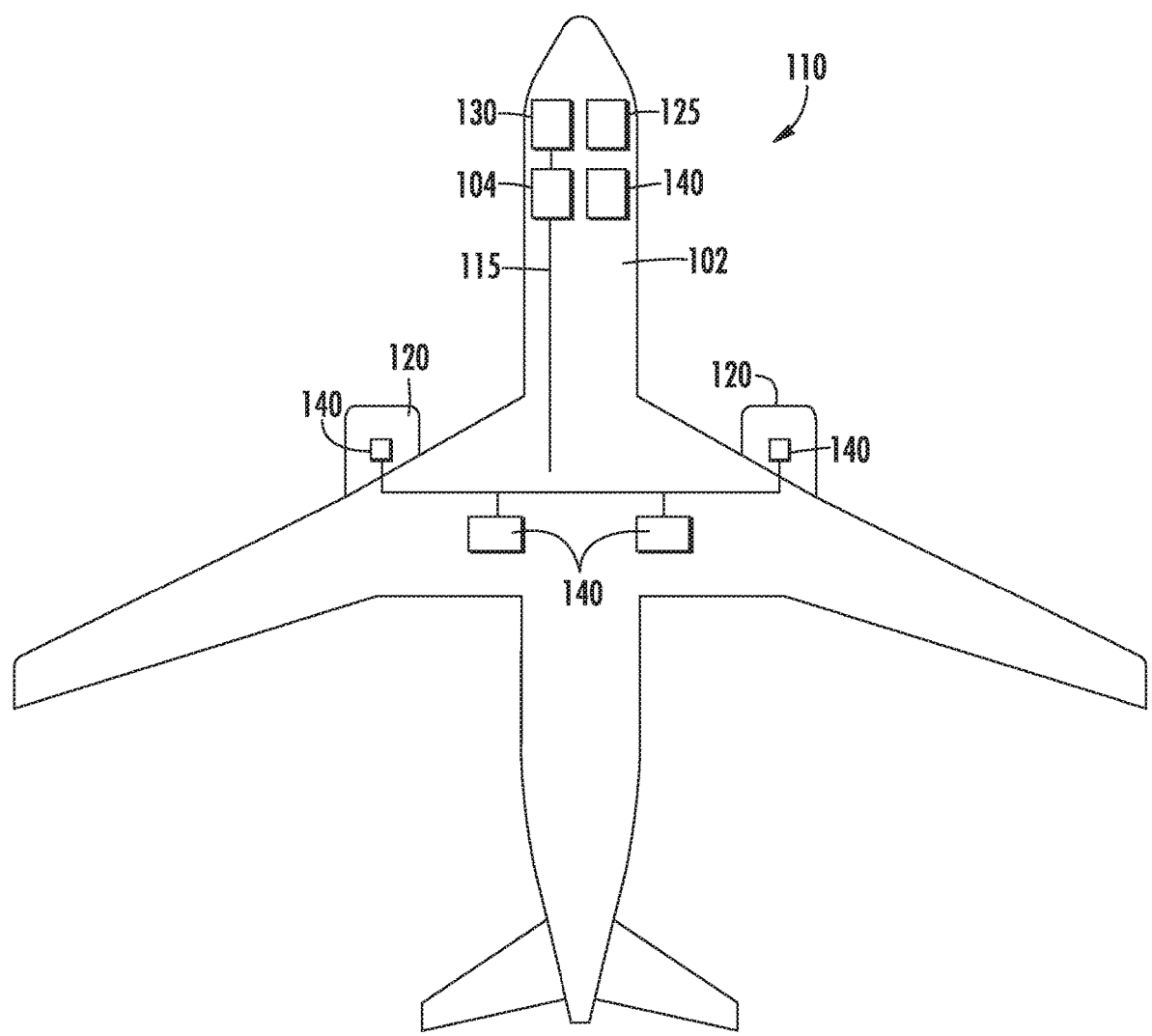
FIG. 1 depicts an overview of an example system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods that determine a cost-improved set of control commands for an aircraft based at least in part on deterioration costs. In particular, as noted above, the Flight Management System (FMS) on an aircraft typically employs a cost function that considers the cost of fuel and the time-related cost to operate the airplane to determine the most efficient set of control commands (e.g., path and speed) for the aircraft to perform a specified mission.

However, one cost that is not currently considered by typical cost determination systems is deterioration costs that result from controlling the aircraft according to the set of control commands. For example, deterioration costs can include accumulated maintenance costs, accumulated replacement costs, costs associated with reduced efficiency due to wear of the system, loss in asset value, or other costs associated with deterioration of the aircraft system due to control of the aircraft according to the set of control commands. As such, the present disclosure provides novel systems and methods that include a model of deterioration costs for one or more systems of the aircraft. The systems and methods of the present disclosure can determine cost-improved control commands based at least in part on the deterioration costs provided by such model.

As an example, one particular deterioration cost that can be considered by the systems and methods of the present disclosure is the cost of engine consumption (e.g., the accumulated maintenance or replacement costs for the engine, the loss in engine value, additional fuel costs due to deterioration in engine efficiency, etc.). More particularly, aircraft engines have a limited lifespan and need to be serviced regularly. The manner in which an engine is operated (e.g., thrust and operating environment) directly affects the lifespan of that engine and/or the service time before a maintenance action is required. A method for defining and managing the improved set of control commands for an aircraft that accounts for the cost of engine consumption is a new and novel concept.

According to one aspect of the present disclosure, a deterioration cost model can be developed to estimate the cost of consuming a system of an aircraft (e.g., a power generator, an environment control system, or any other mechanical system). In one particular example, an engine consumption model can be developed to estimate the cost of consuming the engine. The rate of performance deterioration (e.g., "consumption") can be a function of how the engine is used, not just service time. In some implementations, temperature is a dominant factor in engine consumption, which is, in turn, determined by the magnitude and duration of the thrust produced.

Greater thrust elevates temperature and accelerates degradation. Indeed, thrust is typically de-rated for takeoff and climb to extend the engine time-on-wing at the expense of that flight cycle. However, such thrust de-rating is typically performed manually or according to imprecise tables—not according to a holistic cost approximation process. Thus, one additional benefit of the present disclosure is to provide cost-optimized thrust de-rating as a component or result of the cost-optimized control commands.

Moreover, any system whose operation applies a load on the engine as a function of the operating state of the airplane—that is, any system whose power source is the engine and whose power demand is a function of the operating state of the airplane—may be operated in a manner to reduce operating cost and/or deterioration cost. That is, the airplane may be operated in a manner that reduces or minimizes the load the system applies on the engine, and thereby reduces or minimizes the operating and deterioration cost of the airplane and the system.

According to another aspect, the system and methods of the present disclosure incorporate the deterioration cost model into a new cost function for use in determining the optimal control that minimizes Direct Operating Cost (DOC) blended with the cost of system deterioration (e.g., maintenance/parts). The optimization may be performed in real-time on-board the aircraft or off-board. In one particular example, an engine consumption model can include or provide a schedule of cost rate in units of dollars per pound-thrust per second.

In addition, the rate of engine performance degradation can be a function of the magnitude and duration of the thrust produced. Thus, in practice, climb thrust is de-rated (e.g., reduced) during climb to extend the service life of the engines (e.g., to extend time-on-wing (TOW)). The rationale for de-rating is the increased cost of operating the airplane with de-rated thrust for the forth-coming flight cycle is less than the cost saved by operating the engines at a lower thrust (to extend TOW) over many flight cycles. Because the current methods of de-rating are federated and essentially manual, they are inaccurate, and thus suboptimal. As well, the operator incurs the expense of training air crews, maintaining publications, and procuring EFBs for the purpose of de-rating climb thrust.

To the contrary, in the systems and methods of the present disclosure, an engine consumption model of the monetary cost of consuming the engine can be added to the cost function. Thus, the FMS, performance computer, or similar apparatus determines a guidance solution (e.g., a set of control commands) that minimizes a total cost of operating the airplane, not just the cost of a single, particular flight cycle. This not only leads to a mathematically superior solution, but eliminates unnecessary software complication and pilot action to select and account for de-rated solutions. As such, the systems and methods of the present disclosure can be used to enforce operational de-rate policy in a way that is transparent to the air crew.

According to another aspect of the present disclosure, the deterioration cost model and/or the cost function can be dynamically updated based on new information. For example, the deterioration cost model and/or the cost function can be updated by the FMS of an aircraft. Alternatively an updated model and/or cost function can be received by the FMS from a ground station (e.g., during flight, while grounded, etc.). The updated deterioration cost model and/or updated cost function can be used to re-select an improved set of control commands.

The disclosed systems and methods can have a technical effect of improving aircraft efficiency (e.g., engine efficiency). In particular, the monetary cost of consuming the engine is an alternative measure of how efficiently the engine is operating. The more efficient the engine, the cheaper it is to operate. Thus, the modified cost function of the present disclosure can minimize or otherwise reduce DOC over time, while also minimizing or otherwise reducing fuel consumption and deterioration cost over the life of the airplane.

In addition, the FMSs in service today typically determine a control history that minimizes cost given the level of performance of the engine (e.g., given the Thrust Specific Fuel Consumption (TSFC) of the engine). According to an aspect of the present disclosure, the addition of the cost of system maintenance/consumption yields vehicle control commands that also control TSFC. Thus, for example, controls that extend TOW also maintain the efficiency of the engine over time, providing an added cost reduction due to a more efficient engine. Control commands that optimize both the performance of the airplane and the engines are a new and novel concept and provide a unique approach to improving the efficiency and environmental impact of air transportation.

Another technical benefit of the present disclosure is that the modified cost function also automates the de-rating of the climb thrust setting, which, in turn, reduces the time-related cost of operating the aircraft. This concept can be extended to include takeoff thrust de-rating. The control can be further constrained by safety requirements (e.g., minimum climb rate to clear terrain and obstacles, the state of the atmosphere, the length and condition of the runway, or other constraints). This reduces software complexity and database maintenance requirements. In addition, the benefits of cost reduction are observed over the entire lifespan of the plane rather than just a single flight cycle.

With reference to the Figures, example embodiments of the present disclosure will now be discussed in further detail.

FIG. 1 depicts an example system for enhancing performance of an aircraft 102 according to example embodiments of the present disclosure. As shown, the system includes an onboard computing system 110 that is located on the aircraft 102.

As shown in FIG. 1, the onboard computing system 110 can include one or more computing devices 104 that can be associated with, for instance, an avionics system (e.g., a Flight Management System). The computing device(s) 104 can be coupled to a variety of systems on the aircraft 102 over a communications network 115. The communications network 115 can include a data bus or combination of wired and/or wireless communication links.

The computing device 104 can be in communication with a display system 125 including one or more display devices that can be configured to display or otherwise provide information generated or received by the system to operators of the aircraft 102. The display system 125 can include a primary flight display, a multipurpose control display unit, or other suitable flight display commonly included within a cockpit of the aircraft 102. By way of non-limiting example, the display system 125 can be used for displaying flight information such as airspeed, altitude, attitude, and bearing of the aircraft 102.

The computing device 104 also can be in communication with a flight control computer 130. The flight control computer 130 can, among other things, automate the tasks of piloting and tracking the flight plan of the aircraft 102. The flight control computer 130 can include or be associated with, any suitable number of individual microprocessors, power supplies, storage devices, interface cards, auto flight systems, flight management computers, and other standard components. The flight control computer 130 can include or cooperate with any number of software programs (e.g., flight management programs) or instructions designed to carry out the various methods, process tasks, calculations, and control/display functions necessary for operation of the aircraft 130. The flight control computer 130 is illustrated as being separate from computing device(s) 104. Those of ordinary skill in the art, using the disclosures provided herein, will understand that the flight control computer 130 also can be included with or implemented by the computing device(s) 104.

The computing device(s) 104 also can be in communication with various aircraft systems 140, such as aircraft systems 140 associated with one or more propulsion engines 120 and other components of the aircraft 102. The aircraft systems 140 can include, for instance, digital control systems, thrust systems, inertial reference systems, flight instrument systems, engine control systems, auxiliary power systems, fuel monitoring system, engine vibration monitoring systems, communications systems, flap control systems, flight data acquisition systems, and other systems. The aircraft systems 140 can provide various operating parameters to the computing device(s) 104 for use in determining an operating state of aircraft 102 according to example embodiments of the present disclosure.

For instance, one or more of the aircraft systems 140 can provide flight path data, atmospheric state data and engine state data to the computing device 104 for use in determining an operating state of the aircraft 102. Flight path data can include information such as, but not limited to, altitude, speed, bearing, location and/or other information associated with a flight path of the aircraft. Engine parameter data can include information such as, but not limited to, engine mode data, thrust information, fuel flow, and other information. Atmospheric state data can include information such as, but not limited to, temperature, pressure, dynamic pressure, airspeed and Mach number.

Although the cost-optimization aspects of the present disclosure are described in some example implementations as being performed by a computing system 110 (e.g., Flight Management System) that is on-board the aircraft, the present disclosure is not limited to such examples. The methods and techniques described herein can also be performed by computing devices that are not located on the aircraft. Such off-board computing devices may or may not be in communication with the aircraft 102.

Figure 2:
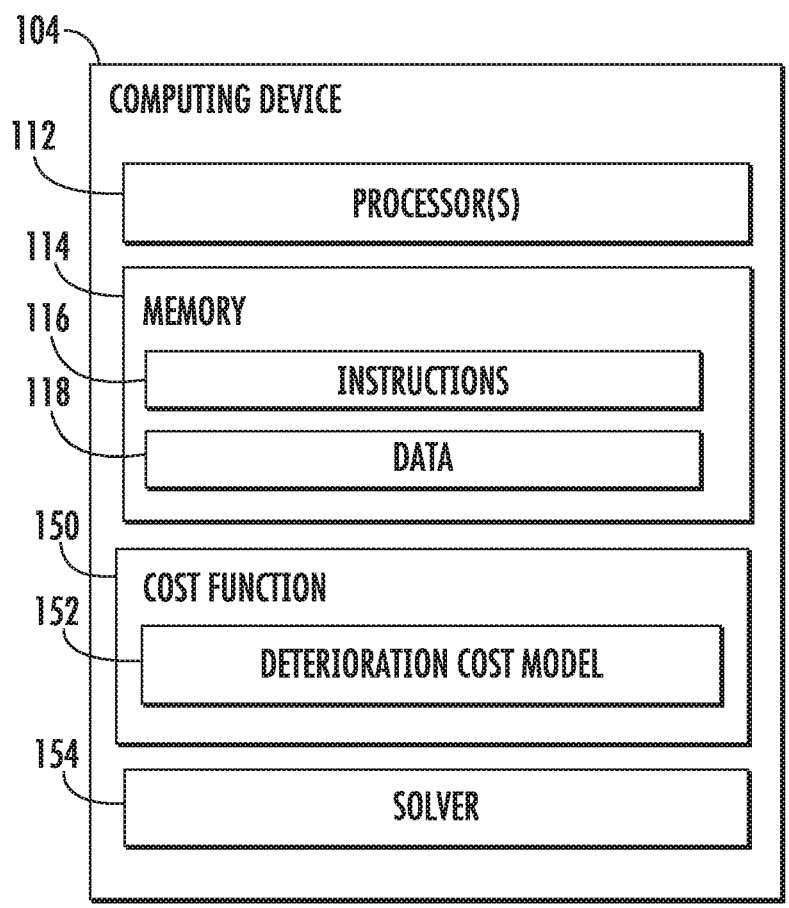
FIG. 2 depicts components of an example computing system implemented onboard an aircraft according to example embodiments of the present disclosure.

FIG. 2 depicts various components of the computing device(s) 104 according to example embodiments of the present disclosure. As shown, the computing device(s) 104 can include one or more processors 112 and one or more memory devices 114. The one or more processors 112 can include any suitable processing device, such as a microprocessor, microcontroller, integrated circuit, logic device, or other suitable processing device. The one or more memory devices 114 can include one or more computer-readable media, including, but not limited to, computer-readable media, RAM, ROM, hard drives, flash drives, or other memory devices.

The one or more memory devices 114 can store information accessible by the one or more processors 112, including computer-readable instructions 116 that can be executed by the one or more processors 112. The instructions 116 can be any set of instructions that when executed by the one or more processors 112, cause the one or more processors 112 to perform operations. The instructions 116 can be written in any suitable programming language or can be implemented in hardware. In some embodiments, the instructions 116 can be executed by the one or more processors 112 to cause the one or more processors to perform operations, such as the operations for enhancing aircraft performance described with reference to FIGS. 3 and 4.

Referring to FIG. 2, the memory devices 114 can further store data 118 that can be accessed by the processors 112. The data 118 can include, for instance, data used to determine an improved set of control commands for an aircraft. For example, the data 118 can include operating and/or control commands. The data 118 also can include data associated with initial or updated models, sample operating states, operating cost estimates, performance parameter data or other data used to perform aircraft performance enhancement processes according to example embodiments of the present disclosure.

According to another aspect, the computing device 104 can determine a cost-improved set of control commands for the aircraft 102 based at least in part on expected future deterioration costs, such as, for example, engine consumption costs. In particular, the computing device 104 can include a cost function 150 that is used to determine cost-improved control commands for the aircraft. The cost function can include or otherwise be influenced by the output of a deterioration cost model 152.

The deterioration cost model 152 can model deterioration costs according based on various input control commands. For example, deterioration costs can include accumulated maintenance costs, accumulated replacement costs, costs associated with reduced efficiency due to wear of the system, loss in value, or other costs associated with deterioration of an aircraft system due to control of the aircraft according to the set of control commands. In some implementations, the deterioration cost model 152 can output a deterioration cost (e.g., a monetary deterioration cost expressed in units of United States Dollars) based on one or more of the following input control commands: speed, flight path, altitude, one or more engine power settings, and/or other control commands or operating parameters.

In some implementations, the deterioration cost model 152 can be a table or schedule. In some implementations, the deterioration cost model 152 can be a function (e.g., a polynomial function) that outputs a cost as a function of the input control commands.

In some implementations, the deterioration cost model 152 can be a machine-learned model, such as, for example, a machine-learned neural network, Markov model, hidden Markov model, or other non-linear multi-layer networks or models. For example, the machine-learned model can be trained on a training dataset (e.g., by performing backpropagation or other training techniques). The training dataset can include input sets of control commands that are respectively labeled with associated deterioration cost outcomes. For example, the labelled training data can be collected from historical cost outcomes (e.g., maintenance logs) or can be hand labelled by experts.

In some implementations, the cost function 150 can be a function that outputs a total cost based at least in part on the deterioration cost output by the deterioration cost model 152 and, in addition, based at least in part on a Direct Operating Cost determined for the inputs. Thus, for example, the cost function 150 can consider fuel, time, and deterioration costs together.

The computing device 104 can also include or implement a solver 154. The solver 154 can minimize or otherwise reduce the cost function 150. As an example, the solver 154 can be an optimization solver, such as, for example, an iterative least squares solver. As described above, the cost function can be iteratively reduced to determine an improved set of control commands that have a reduced cost associated therewith.

In some implementations, limits can be placed on the values that are available for selection for the improved set of control commands. For example, default and/or operator-defined control constraints can be received. The control constraints can define control command values and/or combinations of control command values that are admissible or, alternatively, inadmissible. As one example, a combination of a relatively large altitude and a relatively large speed is an inefficient control scenario. As such, such combination of control commands could be defined as inadmissible by a set of control constraints.

In some implementations, the control constraints are enforced by imposing a penalty on candidate sets of control commands that are outside a boundary defined by the control constrains. For example, one or both of the deterioration cost model 152 and cost function 150 could impose a penalty on a set of candidate control commands that violate one or more of the control constraints. Through such penalization, the computing device 104 is guided towards selection of an improved set of control commands that does not violate the control constraints.

In other implementations, the control constraints can be enforced as a limit on the search space or search area over which the solver 154 operates. For example, the control constraints can be viewed as a filter on candidate sets of control commands that are considered by the computing device 104 (e.g., input into the model 152 and/or the cost function 150 and/or selected by the solver 154).

Thus, in some implementations, a filter that imposes the control constraints can be used in addition or alternatively to the deterioration cost model 152. For example, in some implementations, the filter can be used to limit the search space available to the solver 154 or other cost function reduction algorithm, while the candidate sets of control commands are still input into the deterioration cost model 152 of the cost function 150 to assess deterioration cost associated therewith. In other implementations, the filter can be used to limit the search space available to the solver 154 or other cost function reduction algorithm, while the candidate sets of control commands are input into an alternative cost function that considers only fuel and labor/time costs (i.e., does not include the deterioration cost model 152).

Thus, the example computing device 104 can perform an automated optimization process that determines an improved set of control commands based at least in part on future deterioration costs as estimated by the deterioration cost model 152.

Figure 3:
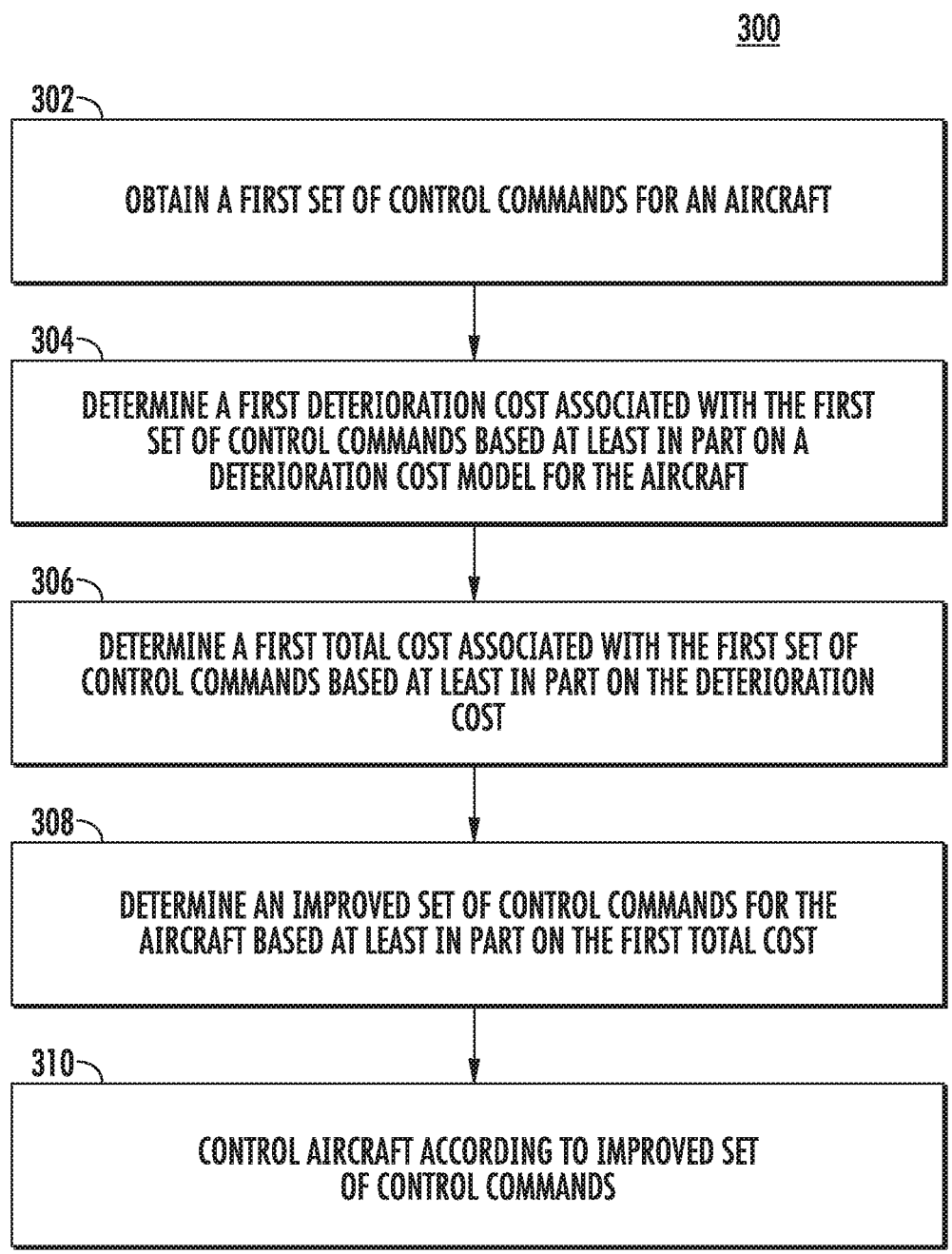
FIG. 3 provides a flow chart of an example method for enhancing aircraft performance according to example embodiments of the present disclosure.

FIG. 3 depicts a flowchart diagram of an example method 300 to improve aircraft efficiency. The method 300 can be performed by any suitable computing device (e.g., computing device 104 of FIGS. 1 and 2).

At 302, the computing device obtains a set of control commands for an aircraft. For example, the control commands can include one or more of speed, flight path, altitude, one or more engine power settings, or other control commands or operating parameters or conditions. The set of control commands can be provided with a user input or can be default control commands.

At 304, the computing device determines a deterioration cost associated with the first set of control commands based at least in part on a deterioration cost model for the aircraft. For example, the computing device can input the set of control commands into the deterioration cost model and, in response, receive the deterioration cost as an output of the model. In one particular example, the deterioration cost model can be an engine consumption model.

At 306, the computing device determines a total cost associated with the set of control commands based at least in part on the deterioration cost. For example, the computing device can input the deterioration cost into a cost function (e.g., alongside the first set of control commands). The cost function can provide the total cost based at least in part on the deterioration cost.

At 308, the computing device determines an improved set of control commands for the aircraft based at least in part on the total cost. For example, the computing device can use a solver to iteratively reduce the cost function. One example method to reduce the cost function is illustrated with reference to FIG. 4.

At 310, the computing device controls the aircraft according to the improved set of control commands. Method 300 can be performed periodically to update the improved set of control commands if various input parameters (e.g., certain operating conditions) change over time.

Figure 4:
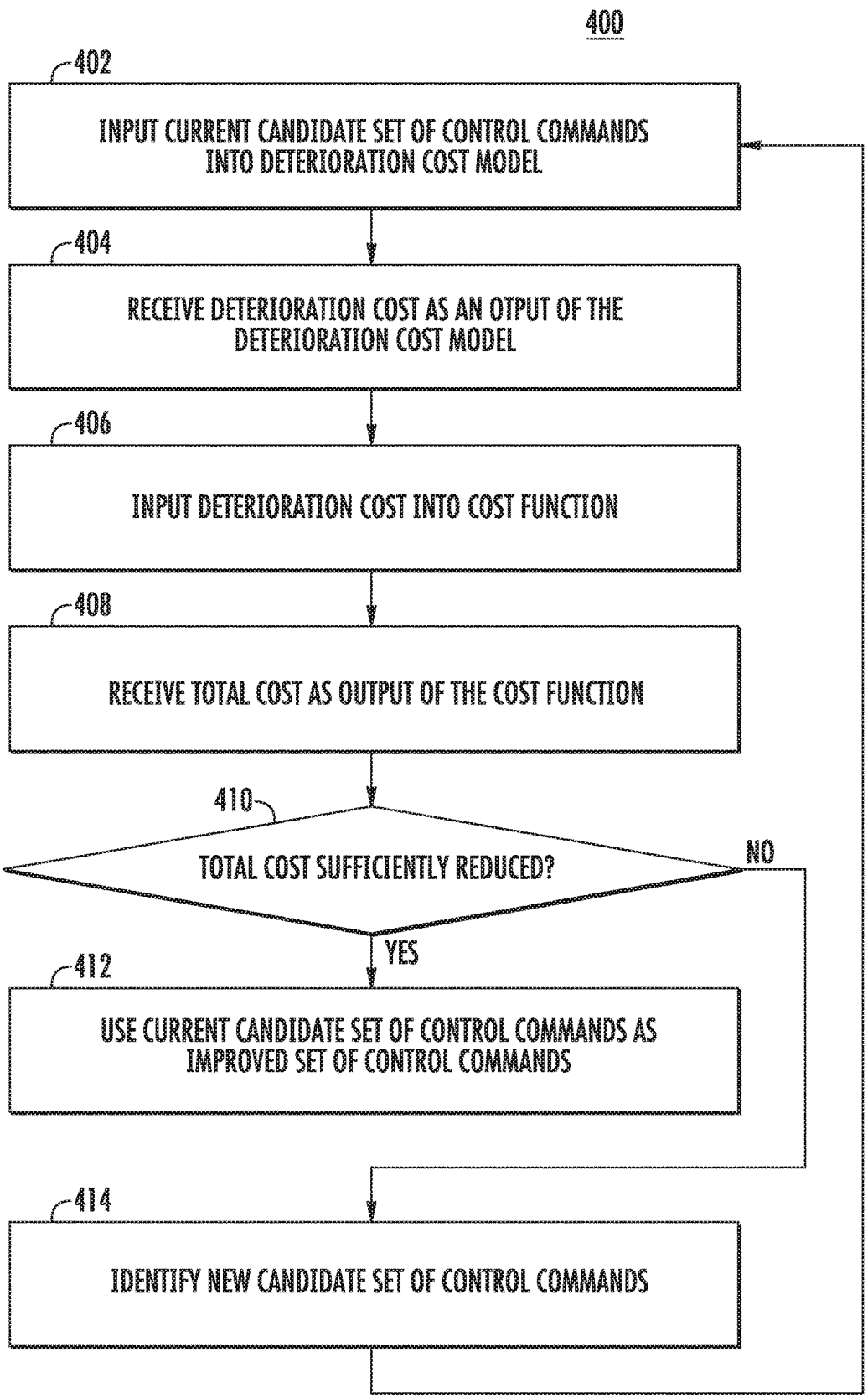
FIG. 4 provides a flow chart of additional aspects of an example method for enhancing aircraft performance according to example embodiments of the present disclosure.

FIG. 4 depicts a flowchart diagram of an example method 400 to improve aircraft efficiency. The method 400 can be performed by any suitable computing device (e.g., computing device 104 of FIGS. 1 and 2).

At 402, the computing device inputs a current candidate set of control commands into a deterioration cost model. At 404, the computing device receives a deterioration cost as an output of the deterioration cost model.

At 406, the computing device inputs the deterioration cost into a cost function (e.g., along with other parameters). At 408, the computing device receives a total cost as an output of the cost function.

At 410, the computing device determines whether the total cost has been sufficiently reduced. For example, the computing device can compare the total cost to a threshold value at 410; if the total cost is less than a threshold value, then the total cost may be sufficiently reduced. As another example, the computing device can compare an iteration-over-iteration change in the total cost to a threshold value at 410; if the change is less than the threshold value, then the total cost may be sufficiently reduced. As another example, a number of iterations performed can be compared to a threshold value at 410; if the total number of iterations performed is greater than the threshold value, then the total cost may be sufficiently reduced.

If it is determined at 410 that the total cost has been sufficiently reduced, then method 400 can proceed to 412 and select the current candidate set of control commands as the improved set of control commands.

However, if it is determined at 410 that the total cost has not been sufficiently reduced, then method 400 can proceed to 414 and identify a new candidate set of control commands that is expected to reduce the total cost. For example, one or more derivatives of the cost function can be used to assist in selecting the new candidate set of control commands.

After 414, method 400 returns to 402 and inputs the new candidate set of control commands into the deterioration cost model. In such fashion, the total cost—which includes deterioration cost—can be iteratively reduced until the total cost is sufficiently reduced.

Figure 5:
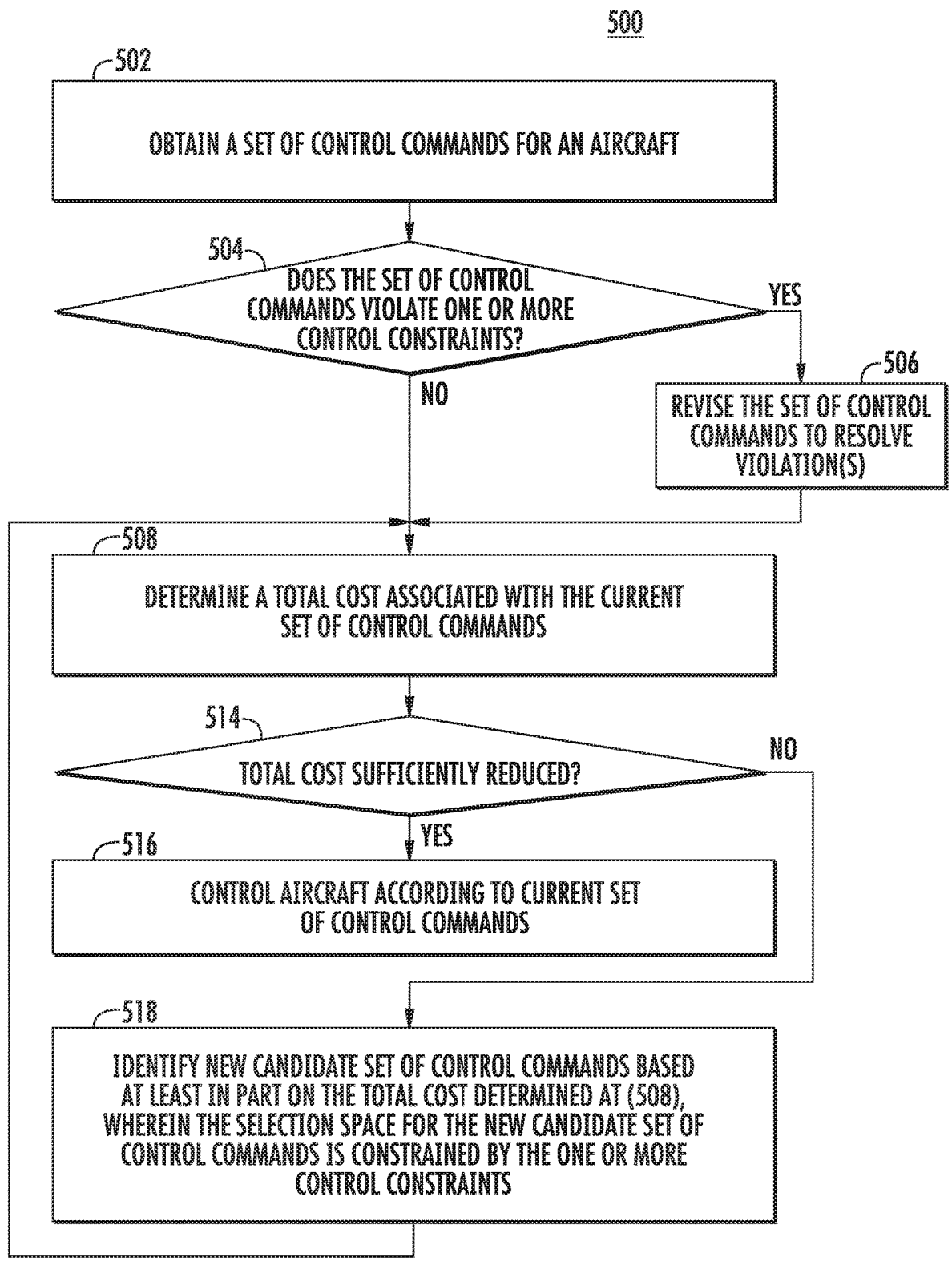
FIG. 5 provides a flow chart of an example method for enhancing aircraft performance according to example embodiments of the present disclosure.

FIG. 5 depicts a flowchart diagram of an example method 500 to improve aircraft efficiency. The method 500 can be performed by any suitable computing device (e.g., computing device 104 of FIGS. 1 and 2).

At 502, the computing device obtains a set of control commands for an aircraft. For example, the control commands can include one or more of speed, flight path, altitude, one or more engine power settings, or other control commands or operating parameters or conditions. The set of control commands can be provided with a user input or can be default control commands.

At 504, the computing device determines whether the set of control commands violates one or more control constraints. If the set of control commands does not violate any control constraints, then method 500 proceeds to 508. However, if it is determined at 504 that the set of control commands does violate one or more control constraints, then method 500 proceeds to 506. At 506, the computing device revises the set of control commands to resolve the violation(s). For example, control command values can be modified to resolve the violation(s). In some implementations, method 500 does not include steps 504 and 506.

At 508, the computing device determines a total cost associated with the current set of control commands. For example, the computing device can input the current set of control commands into a cost function to receive the total cost. In some implementations, the cost function can include a component that models deterioration cost (e.g., a deterioration cost model). However, in other implementations, the cost function does not include such component.

At 514, the computing device determines whether the total cost has been sufficiently reduced. For example, the computing device can compare the total cost to a threshold value at 514; if the total cost is less than a threshold value, then the total cost may be sufficiently reduced. As another example, the computing device can compare an iteration-over-iteration change in the total cost to a threshold value at 514; if the change is less than the threshold value, then the total cost may be sufficiently reduced. As another example, a number of iterations performed can be compared to a threshold value at 514; if the total number of iterations performed is greater than the threshold value, then the total cost may be sufficiently reduced.

If it is determined at 514 that the total cost has been sufficiently reduced, then method 500 can proceed to 516 and control the aircraft according to the current set of control commands. Method 500 can be performed periodically to update the control commands if various input parameters (e.g., certain operating conditions) change over time.

However, if it is determined at 514 that the total cost has not been sufficiently reduced, then method 500 can proceed to 518 and identify a new candidate set of control commands that is expected to reduce the total cost. For example, one or more derivatives of the cost function can be used to assist in selecting the new candidate set of control commands. As an example, the computing device can use a solver to reduce the cost function to identify the improved set of control commands.

In particular, according to an aspect of the present disclosure, at 518, the selection space for the new candidate set of control commands is constrained by the one or more control constraints. For example, a filter can be applied to limit the control commands that are available for selection as the new candidate set of control commands. In some implementations, this can take the form of an iterative loop that iteratively adjusts the new candidate control commands until they do not violate any of the control constraints. In other implementations, the filter can simply reject new candidate control commands that violate constraints.

After 518, method 500 returns to 508 and inputs the new candidate set of control commands into the cost function to determine the total cost. As such, method 500 can iteratively search within a constrained search space for control commands that sufficiently reduce the total cost (which may or may not be based on a deterioration cost associated with the candidate control commands).

Although specific design aspects of various embodiments may be shown in some drawings and not in others, this is for convenience only. In accordance with the principles of the present disclosure, any aspect of a drawing may be referenced and/or claimed in combination with any aspect of any other drawing.

This written description uses examples to disclose the invention, including the best mode, and also to enable any person skilled in the art to practice the invention, including making and using any devices or systems and performing any incorporated methods. The patentable scope of the invention may include other examples that occur to those skilled in the art.

What is claimed is:

1. A computing device to determine improved flight control commands for an aircraft, comprising:
at least one processor; and
at least one non-transitory computer-readable medium that stores a deterioration cost model that models aircraft system deterioration cost as a function of input control commands;
wherein the at least one non-transitory computer-readable medium further stores instructions that, when executed by the at least one processor, cause the computing device to iteratively:
input a candidate set of control commands for the aircraft into the deterioration cost model;
receive, as an output of the deterioration cost model, an estimated deterioration cost associated with the candidate set of control commands;
input the estimated deterioration cost into a cost function to obtain a total estimated cost associated with the candidate set of control commands; and
determine an improved set of control commands based at least in part on the total estimated cost and the cost function,
wherein the candidate set of control commands and the improved set of control commands comprise values for an aircraft flight path, and
wherein the at least one processor is configured to control operation of the aircraft based, at least in part, on the improved set of control commands.

2. The computing device of claim 1, wherein the deterioration cost model comprises an engine consumption model that models engine consumption as a function of the input control commands.

3. The computing device of claim 2, wherein the engine consumption model comprises:
a schedule of cost as a function of one or more operating parameters of the aircraft system; or
a machine-learned neural network.

4. The computing device of claim 1, wherein the computing device comprises a flight management system physically located within the aircraft.

5. The computing device of claim 1, wherein the candidate set of control commands and the improved set of control commands comprise values for aircraft altitude.

6. The computing device of claim 1, wherein at least one of the deterioration cost model and the cost function penalizes the candidate set of control commands when the candidate set of control commands violates one or more control constraints.

7. The computing device of claim 1, wherein to determine the improved set of control commands based at least in part on the total estimated cost and the cost function, the computing device selects a new candidate set of control commands based at least in part on the total estimated cost and the cost function, and wherein the computing device is constrained to select as the new candidate set of control commands only combinations of control commands that do not violate one or more control constraints.

8. A computer-implemented method to determine improved flight control commands for an aircraft having an engine, the method comprising:
obtaining, by one or more computing devices, a set of control commands for the aircraft;
determining, by the one or more computing devices, an engine deterioration cost associated with the set of control commands based at least in part on an engine deterioration cost model for the aircraft;
determining, by the one or more computing devices, a total cost associated with the set of control commands based at least in part on the engine deterioration cost; and determining, by the one or more computing devices, an updated set of control commands for the aircraft based at least in part on the total cost;

controlling, by the one or more computing devices, the aircraft according to the updated set of control commands such that a thrust produced by the engine of the aircraft is automatically de-rated during at least one of a takeoff phase and a climb phase of a flight.

9. The method of claim 8, wherein the engine deterioration cost associated with the set of control commands is determined by the engine deterioration cost model based at least in part on a magnitude and a duration of the thrust produced by the engine of the aircraft.

10. The method of claim 8, wherein determining, by the one or more computing devices, the engine deterioration cost associated with the set of control commands based at least in part on the engine consumption model for the aircraft comprises:

accessing, by the one or more computing devices, an engine consumption schedule that provides cost as a function of one or more operating parameters of the aircraft; and determining, by the one or more computing devices, the engine deterioration cost based at least in part on the engine consumption schedule, the engine deterioration cost in units of dollars.

11. The method of claim 8, wherein the one or more computing devices consist of a flight management system.

12. The method of claim 11, further comprising:
controlling, by the flight management system, the aircraft according to the updated set of control commands.

13. The method of claim 8, wherein obtaining, by the one or more computing devices, the set of control commands comprises obtaining, by the one or more computing devices, one or more values for aircraft speed, aircraft flight path, aircraft altitude, and one or more engine power settings.

14. The method of claim 8, wherein at least one of determining, by the one or more computing devices, the deterioration cost associated with the set of control commands and determining, by the one or more computing devices, the total cost associated with the set of control commands comprises penalizing, by the one or more computing devices, the set of control commands when the set of control commands violates one or more control constraints.

15. The method of claim 8, wherein determining, by the one or more computing devices, the updated set of control commands for the aircraft comprises:

selecting, by the one or more computing devices, a new candidate set of control commands based at least in part on the total cost;

wherein selecting, by the one or more computing devices, the new candidate set of control commands comprises selecting, by the one or more computing devices, only combinations of control commands that do not violate one or more control constraints.

16. A computing device configured to:
obtain an initial candidate set of control commands for an aircraft;

input the initial candidate set of control commands into a cost function;

implement a solver to reduce the cost function, wherein the solver accounts for an estimated deterioration cost associated with an engine of the aircraft, a fuel cost, and a time-related cost to operate the aircraft; and select a final set of control commands for the aircraft, the final set of control commands associated with the reduced cost function, wherein the final set of control commands for the aircraft is selected so as to minimize a total cost of operating the aircraft in monetary units over multiple flight cycles;

wherein the computing device is further configured to ensure that the final set of control commands does not violate one or more control constraints.

17. The computing device of claim 16, wherein the cost function includes a component that models the deterioration cost associated with the engine in monetary units as a function of the input control commands.

18. The computing device of claim 16, wherein to ensure that the final set of control commands does not violate one or more control constraints, the computing device is configured to:

determine whether at least one of the initial candidate set of control commands and the final set of control commands violate one or more control constraints; and in response to a determination that at least one of the initial candidate set of control commands and the final set of control commands violate one or more control constraints, revise the at least one of the initial candidate set of control commands and the final set of control commands to resolve the violation of the one or more control constraints.

19. The computing device of claim 16, wherein to ensure that the final set of control commands does not violate one or more control constraints, the computing device is configured to limit a search space available to the solver to control commands that do not violate one or more control constraints.

20. The computing device of claim 16, wherein the final set of control commands for the aircraft is selected so as to minimize the total cost of operating the aircraft in the monetary units over a lifespan of the aircraft.

* * * * *